May 23, 1961 — W. H. MARTY ET AL — 2,985,222
METHOD OF MAKING A V-BELT
Filed Sept. 25, 1958 — 2 Sheets-Sheet 1
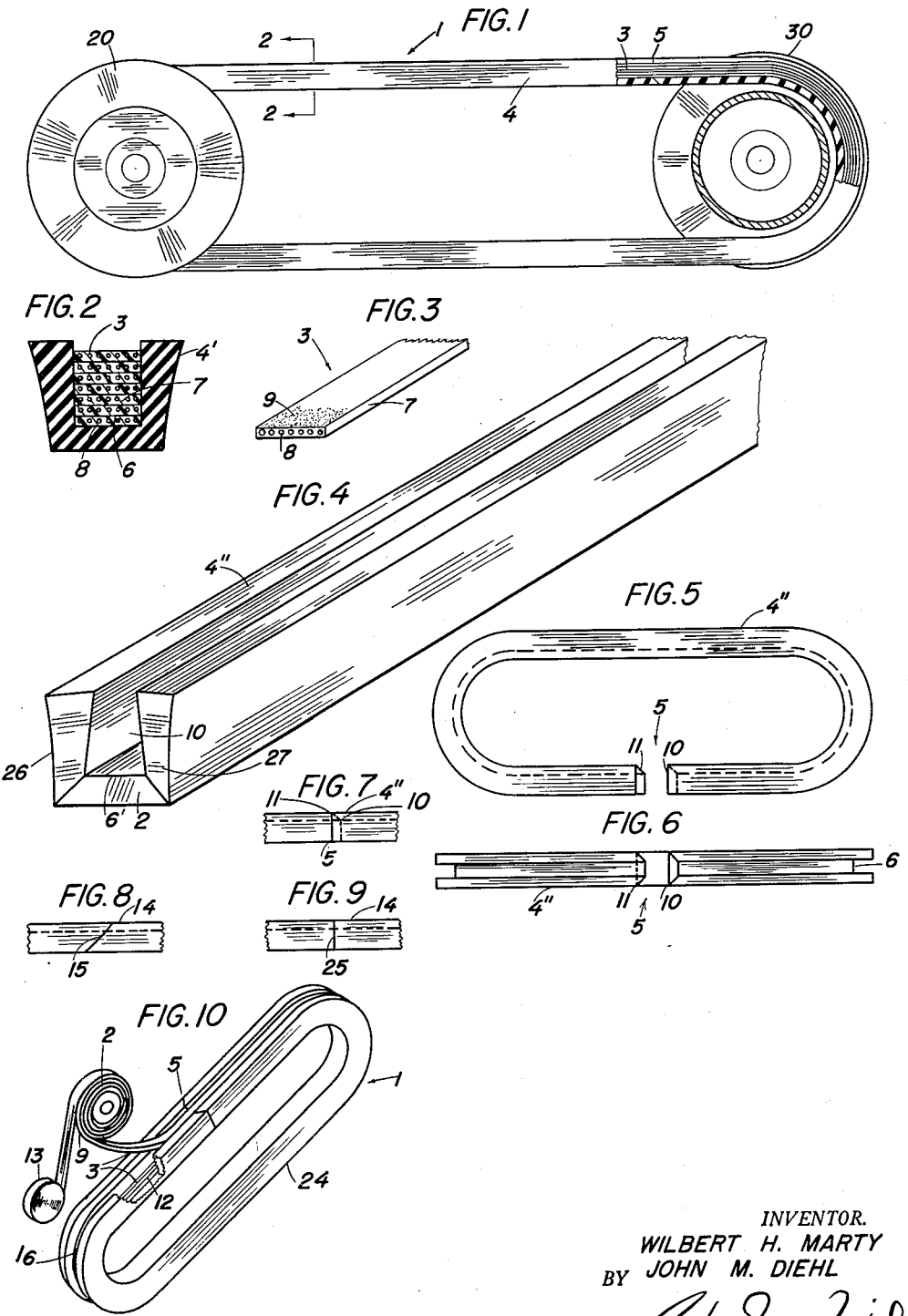
INVENTOR.
WILBERT H. MARTY
BY JOHN M. DIEHL
Attorney May 23, 1961 W. H. MARTY ET AL 2,985,222
METHOD OF MAKING A V-BELT
Filed Sept. 25, 1958 2 Sheets-Sheet 2
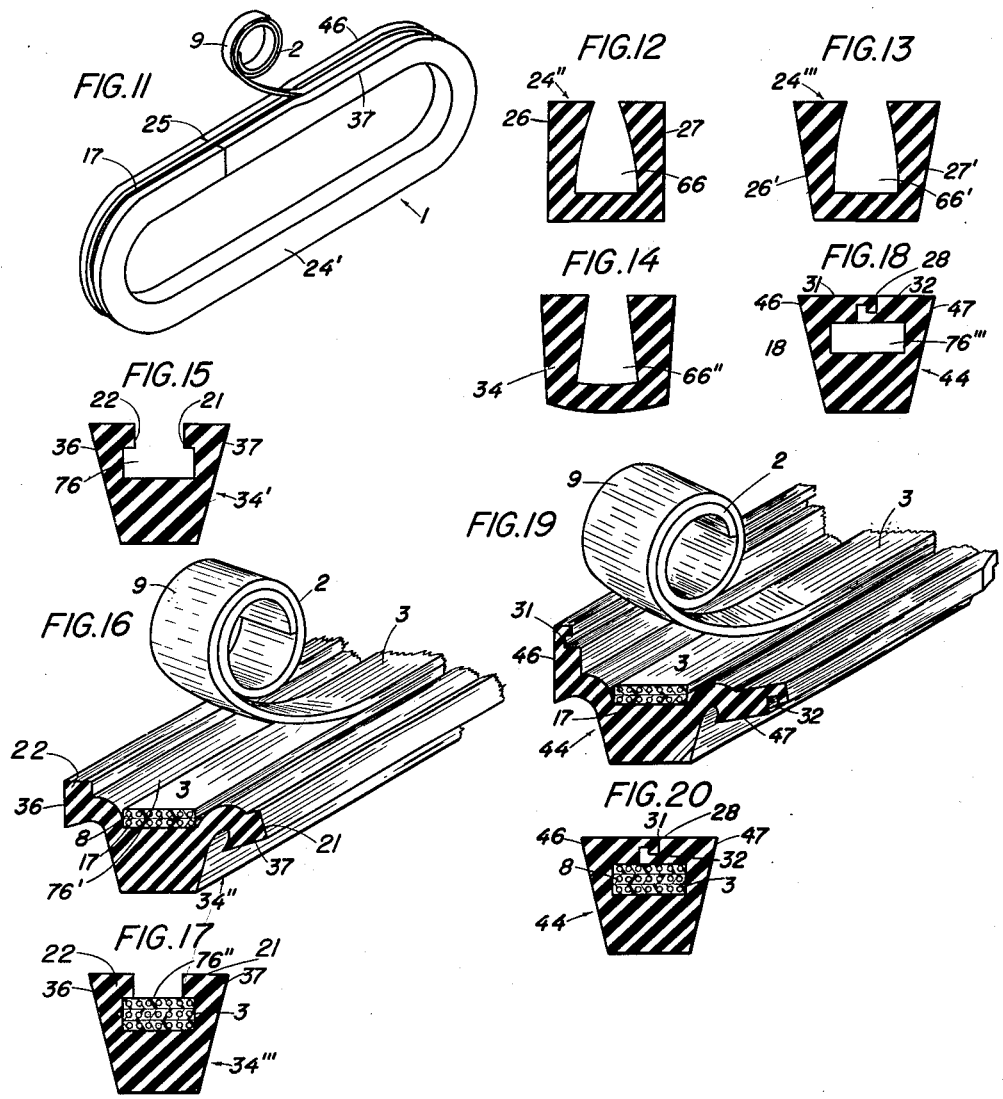
INVENTOR.
WILBERT H. MARTY
BY JOHN M. DIEHL
Attorney United States Patent Office 2,985,222
Patented May 23, 1961

2,985,222

METHOD OF MAKING A V-BELT

Wilbert Henry Marty and John M. Diehl, Madison, Wis., assignors to Bjorksten Research Laboratories, Inc., Fitchburg, Wis., a corporation of Illinois Filed Sept. 25, 1958, Ser. No. 763,392

13 Claims. (Cl. 154—4)

This invention relates to a method of making a V-belt and more particularly to a method of making a V-belt at the time and place where needed, thereby obviating the necessity of stocking extra V-belts or having to go in search for the proper sized V-belt.

In recent years there has been an increasing number of applications for use of V-belts as a practical and convenient means of driving equipment. As the country has become mechanized the V-belt has increased in popularity to its present status.

Due to the increased use of V-belts there has been a corresponding increase in V-belt stock, to be kept on hand of necessity at the various parts stores, filling stations, garages, and etc. Although an efficient commercial concern has always kept a large stock of V-belts, it has always been difficult to obtain the desired length V-belt due to the great variance in length of V-belt needed for specific job applications. This problem of finding a specific length V-belt has become increasingly difficult and expensive.

To obviate the necessity of measuring a broken belt and going to the nearest garage or filling station to obtain the desired length, belts have been previously provided as an interlocking sectional belt which could be shortened or lengthened by adding or removing sections. This belt has proven to be unsatisfactory inasmuch as it operates at a considerable reduction in strength i.e. 20 to 30%, from that exhibited by a conventional V-belt, and also has not lasted as long or run as quietly as a conventional V-belt.

As many belt driven machines are run at high speeds, V-belts have had a tendency to wear and break quite easily. Thus it may be easily understood why such prior field assembled belts have not taken the place of the manufactured belt. It has been desired to obtain a belt which would have the strength and durability of a manufactured endless V-belt and yet be provided at any desired length in the field or at inaccessible places when needed.

Therefore, an object of the present invention is to provide an endless V-belt of any length or size which may be assembled in the field or at inaccessible places.

Another object is to provide a V-belt for field assembly which is stronger and more durable than any field assembled V-belt heretofore provided.

Another object is to provide a V-belt for field assembly which will save shut-down time on a particular machine which depends on a V-belt drive.

Another object is to provide a V-belt which may be assembled at any place or at any time with no increase in cost over the heretofore manufactured endless belt.

Another object is to provide a V-belt which may be assembled in the field and is comparable in strength to the heretofore manufactured endless V-belt.

Other objects will become apparent from the drawings and from the following detailed description in which it is intended to illustrate the applicability of the invention without thereby limiting it to a scope of less than that of all equivalents which will be apparent to one skilled in the art. In drawings, like reference numerals refer to to like parts and in which:

Figure 1 is an elevation of a V-belt in position on two sheaves.

Figure 2 is a cross-sectional view of the belt in Figure 1 with the reinforcing material in final position.

Figure 3 is a perspective view of a section of V-belt reinforcing material.

Figure 4 is a perspective view of a section of channeled V-belt material before inserting the reinforcing material.

Figure 5 is an elevation of a V-belt of the material shown in Figure 4 before closing the joint.

Figure 6 is a bottom view of the V-belt in Figure 5.

Figure 7 is an elevation of the closed V-belt joint illustrated in opened position in Figure 5 and Figure 6.

Figure 8 is an elevation of an alternate joint.

Figure 9 is an elevation of an alternate joint.

Figure 10 is a partially cut away perspective view of a V-belt in the process of fabrication being reinforced with material which is shown in Figure 3.

Figure 11 is a perspective view of the fabrication of a V-belt similar to that shown in Figure 10.

Figure 12 is a cross-sectional view of material which may be used alternately as an embodiment of V-belt material used as an extended channel member as shown in Figure 11.

Figure 13 is a cross-sectional view of material which may be used alternately as an embodiment of V-belt material used as an extended channel member as shown in Figure 11.

Figure 14 is a cross-sectional view of material which may be used alternately as an embodiment of V-belt material used as an extended channel member as shown in Figure 11.

Figure 15 is a cross-sectional view of V-belt material similar to the preceding embodiments shown in Figures 12, 13 and 14.

Figure 16 is a perspective view of a section of V-belt material shown in Figure 15 being reinforced with tape material similar to that shown in Figure 3.

Figure 17 is a cross-sectional view of V-belt channel material shown in Figure 16 after reinforcing tape has been inserted.

Figure 18 is a cross-sectional view of V-belt material slightly modified from that of Figure 15 and preceding embodiments of like character showing extending interlocking lips.

Figure 19 is a perspective view of a section of V-belt material shown in Figure 18 being reinforced with tape material similar to that shown in Figure 3.

Figure 20 is a cross-sectional view of V-belt material shown in Figure 19 after the reinforcing tape is inserted.

In accordance with the invention, when a V-belt is needed in the field a portion of channel material as described hereinafter may be first circumferentially wound around the sheaves from which the old V-belt was taken to determine the length needed. When the desired length has been determined, the channel material is cut to length and shaped to provide matching ends. The ends are then placed together with the material extending around said sheaves and reinforced tape or plain tape of polyester plastic or the like provided with pressure sensitive adhesive on one or both sides is circumferentially wound in a plurality of layers within the open channel of the channel material to fill the channel and thereby provide a finished V-belt. The V-belt is preferably assembled while on the sheaves, as described, because the desired length and tension of the belt are easily obtained, but it may also be assembled in any other suitable location.

Referring now to Figure 1, there is shown an elevation of a V-belt indicated generally as 1. V-belt 1, as shown, is disposed in a normal operating position on sheaves 20 and 30 and is also in the position in which it may be assembled. As shown, a portion of extended flexible channel member 4 is circumferentially wound around sheaves 20 and 30 and the ends of channel member 4 are beveled so as to fit one within the other at joining point 5 to form an endless belt 1. A plurality of layers of reinforced tape 3 are circumferentially wound around channel member 4 and sheave 30 is partially cut away to show the layers of reinforced tape 3 on partially cut away flexible channel member 4. The tape 3 may be tape without reinforcing strands such as a polyester plastic tape.

Figure 2 is a cross-sectional view of the embodiment of our invention shown in Figure 1 taken on line 2—2. As shown in Figure 2, flexible channel member 4' has an open channel 6 in which there is placed a plurality of layers of reinforced or plain tape 3. Tape 3, as shown, is provided with a plurality of longitudinally extending reinforcing strands 8 which may, if desired, constitute warp threads in a woven tape but generally are parallel extending strands laminated to a surface of a plastic tape. The reinforcing strands 8 of tape 3 may comprise or consist of conventional reinforcing strands used in the manufacture of V-belts, such as rayon, Dacron, nylon, cotton, Fiberglas, steel wires or other like materials and may be laminated to or if desired, be encased or ensheathed in a body 7 which may be of synthetic rubber, rubber, polyester, polyethylene product or the like.

Figure 3 shows a perspective view of a portion of tape 3. As shown, tape 3 comprises a body 7 of flexible or pliable material such as synthetic resinous tape having longitudinal reinforcing threads or strands 8 embedded therein or laminated thereto as mentioned above. Body 7 may be composed of any pliable tough material such as rubber, coated fabric, polyethylene, polyethylene terephthalate, or the like, and is coated with a layer of pressure sensitive adhesive 9 on one or both sides so as to cause one layer of tape to adhere to another layer of tape 3, as shown by the plurality of layers of tape 3 in Figure 2. The pressure sensitive adhesive 9 may be any suitable rubber based or synthetic rubber based adhesive or the like.

Figure 4 is a perspective view of a portion of V-belt channel material 4'' prior to making a V-belt. Flexible channel member 4'' is provided with an open channel 6' and outer walls 26 and 27 and is shown prior to application of tape 3. End 10 of extended flexible channel member 4'' is beveled so as to fit within the opposing end 11 of channel member 4'' as shown in Figures 5, 6 and 7. The inwardly beveled end 10 may be preformed to allow for insertion of outwardly beveled end 11 shown in Figure 5 which may be cut to fit within the inwardly beveled end 10 by using an ordinary pocket knife to shape the outwardly beveled end 11. Inwardly beveled end 10 may also be provided by using a small beveling instrument to provide the desired bevel shaped end on any desired length of flexible channel member 4''.

Figure 5 is an elevation of extended flexible channel member 4'' with its inwardly beveled end 10 and outwardly beveled end 11 disposed in opposition to one another prior to the placing of outwardly beveled end 11 within inwardly beveled end 10. A V-belt made according to the invention with a channel member having ends as shown in Figure 5 is preferably run in a counterclockwise direction for the retention of beveled ends 10 and 11 within one another.

Figure 6 is a bottom view of the ends 10 and 11 of flexible channel member 4'' of Figure 5, showing the shape of the inward and outward bevel of ends 10 and 11 respectively to more clearly illustrate how ends 10 and 11 are placed one within the other to form a joint 5.

Figure 7 is an elevation of ends 10 and 11 of flexible channel member 4'' subsequent to their being placed together in a joint 5.

Figure 8 is an elevation of a scarf joint 15 which is an alternate means of placing the ends of extended flexible channel member 14 together.

Figure 9 is an elevation of a butt joint 25 which is an alternate means of placing the ends of extended flexible channel member 14' together.

The joinder of the ends of the extended channel member as shown in Figures 7, 8 and 9 may be sealed by a process of vulcanizing the ends after joining, as shown.

Figure 10 is a partially cut away perspective view of V-belt 1 comprising flexible channel member 4 with its ends placed together to form a joint 5. Channel member 24 is disposed in a position to permit winding of a plurality of layers of reinforced or plain tape 3 within channel 16. Tape 3 may be started at any point within channel 16 of channel member 24 and tape 3 will extend circumferentially around channel member 24 until a plurality of layers of tape 3 are disposed in channel 16. As shown by cut away portion 12, channel member 24 is substantially reinforced by said layers of tape 3 until V-belt 1 is complete. As illustrated in Figure 10, reinforced or plain tape 3 is unwound from tape roll 2; backing sheet 13 may simultaneously be removed from tape 3 to expose pressure sensitive adhesive surface 9 of tape 3. Adhesive 9 causes tape 3 to adhere to itself when filling channel 16 of channel member 24 to complete V-belt 1.

Figure 11 is a perspective view of V-belt 1 after a plurality of layers of tape 3 have been disposed within channel 46 of channel member 24' to thereby fill channel 46 and substantially complete V-belt 1. Figure 11 also shows the butt joint 25 of Figure 9 which is another means of placing the ends of channel member 24' together prior to winding of tape 3. When using a butt joint 25, as shown, the joinder may be vulcanized as hereinbefore mentioned.

The channel member may have any suitable cross-section in order to cause a V-belt made therefrom in accordance with the invention to have the necessary trapezoidal shape when it is completed. Thus, Figure 12 is an enlarged cross-section of one embodiment of channel member 24'' showing the outer opposing walls 26 and 27 prior to application of reinforced tape 3 in channel 66. As shown, the outer portions of walls 26 and 27 are not inclined prior to application of tape 3, but instead are perpendicular to the base portion of channel member 24'', so that when the channel is filled the walls will extend somewhat outwardly.

Figure 13 is an enlarged cross-section view of another embodiment of channel member 24''' with outer walls 26' and 27' extending toward the base portion of channel member 24''' at an inclined angle, to compensate for forcing them outwardly in a V-belt made therefrom. Such forces may include outward pressure of tape in the channel and flexing forces applied to the belt as it travels over a sheave.

Figure 14 is an enlarged cross-sectional view of an alternate form of channel member 34 having an arcuate base prior to application of tape 3 so that after filling the channel with tape the base may be straight.

Figure 15 is an enlarged cross-section of another embodiment of channel member 34' showing a partially enclosing lip extension 22 of wall 36 over channel 76 and a partially enclosing lip extension 21 of wall 37 over channel 76.

Figure 16 is a perspective view of an embodiment of a portion of channel member 34'' having wall 36 with extension lip 22 and wall 37 with extension lip 21 as shown in Figure 15. Channel member 34'' may be distended in a manner as illustrated to permit reinforced tape 3 to be freely wound in a plurality of layers in channel 76'.

Figure 17 shows a cross-sectional view of channel member 34''' of Figure 15 with a plurality of layers of tape 3 longitudinally disposed in channel 76'' of V-belt material 34'''. As shown, lips 21 and 22 of the outer walls 37 and 36 respectively extend over the layers of tape 3.

Figure 18 shows a cross-sectional view of flexible channel member 44 provided with outer walls 46 and 47, said walls each having a lip extending inwardly from the walls to join and interlock at point 28 above channel 76''' and enclose channel 76'''. Lip 31 is affixed to wall 46 and lip 32 is affixed to wall 47.

As shown in Figure 19, the flexible channel member 44 of Figure 18 may be flexed to cause lips 31 and 32 to open up to thereby provide clearance for layers of reinforced tape 3 to be disposed in channel 76'''.

Referring now to Figure 20 there is shown a cross-section of a completed V-belt 1, utilizing the embodiment of Figures 18 and 19, subsequent to the application of reinforced or plain tape 3 and the closing and interlocking of lips 31 and 32.

The flexible channel member 44 of which the V-belt body is made, may be any substantially strong resilient material such as reinforced rubber, neoprene, synthetic rubber and other suitable materials well known in the art of V-belt manufacture.

While certain modifications and embodiments of the invention have been described, it is of course to be understood that there are great numbers of variations which will suggest themselves to anyone familiar with the subject matter thereof and it is distinctly understood that this invention should not be limited except by such limitations as are clearly imposed in the appended claims.

We claim:

1. The method of making an endless V-belt comprising the steps of providing an extended flexible channel member comprising elastomeric material and being generally V-shaped, said channel member having pulley engaging side walls and having a wall joining said side walls and a channel situated between said side walls, extending said channel member circumferentially around a set of sheaves, providing tape having at least one surface coated with pressure sensitive adhesive, and circumferentially winding a single unbroken length of said tape repeatedly around said channel member to provide a plurality of layers of said tape within said channel of said channel member and at least partially filling said channel to thereby provide a V-belt having a substantially solid cross-section.

2. The method of making an endless V-belt comprising the steps of providing an extended flexible channel member comprising elastomeric material and being generally V-shaped and having pulley engaging side walls and having a wall joining said side walls and a channel situated between said side walls, cutting off a sufficient length of said flexible channel member to extend circumferentially around a set of sheaves, shaping the ends of said flexible channel member to fit one to the other, placing one end of said flexible channel member adjacent to the other end of said flexible channel member to form an endless channel member, providing reinforced tape having at least one surface coated with pressure sensitive adhesive with reinforcing strands embedded therein, and circumferentially winding a single unbroken length of said tape repeatedly around said channel member to provide a first layer of tape adhered to the bottom of said channel and additional layers of tape continuous with the tape of said first layer adhered to said first layer and to one another, said layers at least partially filling said channel, to thereby provide a V-belt having said reinforced tape as reinforcement therein.

3. The method of claim 1 further characterized by said tape being reinforced with strong reinforcing strands extending longitudinally of said tape.

4. The method of claim 1 further characterized by beveling the ends of said channel member so to fit one within the other and placing one end of said channel member within the other end of said channel member to form an endless channel member.

5. The method of claim 1 further characterized by shaping the ends of said channel member to fit one to the other, placing one end of said channel member adjacent the other end of said channel member and vulcanizing said ends together to form an endless channel member.

6. The method of claim 2 further characterized by said reinforced tape having strong flexible reinforcing strands extending longitudinally of said tape.

7. The method of claim 2 further characterized by beveling the ends of said flexible channel member so to fit one within the other and placing one end of said flexible channel member within the other end of said channel member to form an endless channel member.

8. A V-belt comprising a longitudinally extended generally V-shaped channel member having pulley engaging side walls and having a wall joining said side walls and a channel situated between said side walls, said channel member adapted to extend circumferentially around a set of sheaves to form an endless channel and a length of tape, said tape provided with a coating of pressure sensitive adhesive on at least one side of said tape, said tape being received in a plurality of continuous unbroken layers in said channel of said channel member so to at least partially fill said channel and thereby form an endless belt.

9. A V-belt comprising a longitudinally extended generally V-shaped channel member of elastomeric material having pulley engaging side walls and having a wall joining said side walls and a channel situated between said side walls, said channel member adapted to extend circumferentially around a set of sheaves and the ends of said channel member adapted to fit one adjacent to the other, and a length of reinforced tape, said reinforced tape provided with a coating of pressure sensitive adhesive on at least one side of said tape, said tape being received in a plurality of continuous unbroken layers in said channel of said longitudinally extending channel member so to at least partially fill said channel of said channel member and thereby form an endless belt.

10. The article of claim 8 further characterized by said tape having strong flexible reinforcing strands extending longitudinally of said tape.

11. The article of claim 8 further characterized by the ends of said channel member being bevel shaped so to fit one within the other to form an endless channel member.

12. The article of claim 9 further characterized by said reinforced tape having strong flexible reinforcing strands extending longitudinally of said tape.

13. The article of claim 9 further characterized by said ends of said flexible channel member being bevel shaped so as to fit one within the other.

References Cited in the file of this patent

UNITED STATES PATENTS

| | | |
|---|---|---|
| 1,463,596 | Schade | July 31, 1923 |
| 1,530,774 | Kepler | Mar. 24, 1925 |
| 2,430,328 | Daniels | Nov. 4, 1947 |
| 2,439,043 | Evans | Apr. 6, 1948 |
| 2,750,314 | Bemmels | June 12, 1956 |
| 2,750,315 | Tierney | June 12, 1956 |